United States Patent
Lessle (10) Patent No.: US 10,444,548 B2
(45) Date of Patent: Oct. 15, 2019

(54) EYEWEAR WITH TRANSPARENT COMPONENT FOR GENERATING COLOR EFFECTS

(71) Applicant: Carl Zeiss Vision International GmbH, Aalen (DE)

(72) Inventor: Werner Lessle, Oberkochen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 15/701,013

(22) Filed: Sep. 11, 2017

(65) Prior Publication Data
US 2018/0074347 A1 Mar. 15, 2018

(30) Foreign Application Priority Data
Sep. 14, 2016 (EP) .................................... 16188739

(51) Int. Cl.
G02C 7/12 (2006.01)
B29D 11/00 (2006.01)
G02C 7/02 (2006.01)
G02B 5/30 (2006.01)

(52) U.S. Cl.
CPC ................ *G02C 7/12* (2013.01); *B29D 11/00* (2013.01); *B29D 11/00644* (2013.01); *G02C 7/022* (2013.01); *G02B 5/3083* (2013.01); *G02C 2202/16* (2013.01)

(58) Field of Classification Search
CPC ........... G02C 7/022; G02C 7/049; G02C 7/12
USPC ..................... 351/49, 159.01, 159.27, 159.56
See application file for complete search history.

(56) References Cited

U.S. PATENT DOCUMENTS

| 4,071,912 A | 2/1978 | Budminger |
| 4,155,122 A | 5/1979 | Budminger |
| 5,805,336 A * | 9/1998 | Dalzell ............... B29D 11/0073 264/1.32 |
| 7,093,935 B2 | 8/2006 | Parnell |
| 2007/0263169 A1 | 11/2007 | Lipton |

(Continued)

FOREIGN PATENT DOCUMENTS

| CH | 594403 A5 | 1/1978 |
| CN | 1804683 A | 7/2006 |

(Continued)

OTHER PUBLICATIONS

Extended European Search Report of European patent application 16188739.3, from which this application claims priority, dated Oct. 3, 2017.

(Continued)

*Primary Examiner* — Darryl J Collins
(74) *Attorney, Agent, or Firm* — Ewers & Hasselmann PLLC (57) ABSTRACT

A transparent component for eyeglasses is provided. The transparent component includes a birefringent layer and at least one linearly polarizing layer. Polarized light falling on the transparent component exhibits a color effect. Additionally, a second linearly polarizing layer may be provided such that the birefringent layer is sandwiched between the linearly polarizing layer and the second linearly polarizing layer. When the second linearly polarizing layer is provided, non-polarized light falling on the transparent component also exhibits a color effect.

13 Claims, 5 Drawing Sheets

(56) References Cited

U.S. PATENT DOCUMENTS

| | | | |
|---|---|---|---|
| 2012/0262669 A1* | 10/2012 | Boinard | B29C 43/3697 351/159.56 |
| 2014/0139802 A1* | 5/2014 | Jallouli | G02B 5/3083 351/159.56 |
| 2014/0157576 A1 | 6/2014 | Begon et al. | |
| 2015/0185480 A1* | 7/2015 | Ouderkirk | G02B 27/0172 359/489.19 |
| 2015/0301356 A1 | 10/2015 | Tabirian et al. | |

FOREIGN PATENT DOCUMENTS

| | | |
|---|---|---|
| CN | 2872397 Y | 2/2007 |
| CN | 103813898 A | 5/2014 |
| DE | 2619144 A1 | 11/1977 |
| WO | 2004/057413 A1 | 7/2004 |
| WO | 2006/043945 A2 | 4/2006 |

OTHER PUBLICATIONS

"Polarizer" article available at https://en.wikipedia.orgiwiki/Polarizer—last accessed Aug. 30, 2017.

"Polarizing spectacle lenses" article available at http://www.zeiss.deivision-care/de_de/products-services/veredelungen-und-toenungenlsonnenschutz-und-filterglaeser/polarisierende-brillenglaeser.html and English-language translation thereof—last accessed Aug. 30, 2017.

E. Milby, "Investigating Stress Birefringence Using Photoelasticity", fp.optics.arizona.edu/optomech/archive/Spr10/523L/Individual%20Project/Ezra_final%20Lab%20Writeup.pdf, Spring 2010.

R. Wimberger-Friedl, "Molecular orientation induced by cooling stresses. Birefringence in polycarbonate: III. Constrained quench and injection molding," Abstract, Journal of Polymer Science Part B: Polymer Physics vol. 32, Issue 4, 1994.

"Polarisiertes Licht (Polarized Light)," www.physik.uni-erlangen.de/lehre/daten/Nebenfachpraktikum/Polarisiertes Licht. pdf last accessed Sep. 14, 2016, and English-language translation thereof.

Zinth/Körner, Physik III., first edition 1994, R. Oldenburg Verlag GmbH, pp. 164-178, and English-language translation thereof.

Office action issued by the Chinese Patent Office in CN 201710826887.3, which is a counterpart hereof, dated Jan. 25, 2019, and English-language translation thereof.

* cited by examiner

EYEWEAR WITH TRANSPARENT COMPONENT FOR GENERATING COLOR EFFECTS

CROSS REFERENCE TO RELATED APPLICATION

This application claims priority to European patent application no. EP 16 188 739.3, filed Sep. 14, 2016, the entire content of which is incorporated herein by reference.

FIELD OF THE DISCLOSURE

The present application relates to eyewear with a transparent component which generates color effects when looking through the transparent component.

BACKGROUND OF THE DISCLOSURE

It is known that transparent components may have properties influencing the way a scene appears when viewed through the transparent component. For example, eyeglasses with eyeglass lenses having polarizing properties may be used to reduce reflections. However, in this case merely reflections are reduced without providing any "special effects." For example, sunglasses having polarizing properties are described in U.S. Pat. No. 7,093,935 B2.

SUMMARY OF THE DISCLOSURE

It is an object of the present application to provide eyewear having a transparent component which provides color effects when looking through the transparent component.

Eyewear generally refers to a device for correcting, aiding or modifying the vision of a person and/or protecting the eyes of a person. Examples include eyeglass lenses (also referred to as spectacle lenses), eyeglasses including such eyeglass lenses, contact lenses, goggles, shields, e.g., for masks like skiing masks, or masks including such shields. Eyewear in this sense may include devices to be worn on a head of a person or components for such devices. In the present disclosure, the eyewear modifies the vision by providing a color effect.

According to an aspect of the disclosure, an eyewear with a transparent component is provided that includes a linearly polarizing layer and a birefringent layer, wherein a viewing direction runs through the linearly polarizing layer and the birefringent layer. The viewing direction is the direction in which a person looks through the transparent component during regular use of the eyewear. For example, in case of eyeglasses the regular use corresponds to the person wearing the eyeglasses in a normal fashion on his or her head.

A transparent component refers generally to a component through which a scene, comprising for example one or several objects, may be viewed. Transparent components as discussed above may for example be provided as eyeglass lenses (also referred to as spectacle lenses). Such eyeglass lenses may be provided in a glasses frame to form eyeglasses. In this way, a person may easily wear the thus formed eyeglasses and experience the color effect.

A linearly polarizing layer as used herein is a layer which lets only light pass that has a linear polarization in a particular polarization direction, whereas light having a polarization perpendicular to the polarization direction essentially may not pass. "Essentially" here refers to the fact that depending on the quality of the polarizing layer, some light with a polarization perpendicular to the particular direction still may pass the polarizing layer. The polarization efficiency P is defined in DIN EN 1836 as $P=(I_{max}-I_{min})/(I_{max}+I_{min})$, $I_{max}$ being the maximum value of light transmission through the polarizing layer and $I_{min}$ being the minimum value. To determine these values, for example the linearly polarizing layer is irradiated with 100% linearly polarized light, and the relative angle between the particular polarization direction of the polarizing layer and the polarization direction of the light is varied. When the angle between these directions is 0°, maximum transmission occurs. For another angle, usually about 90°, minimum transmission occurs. The polarization efficiency in embodiments may be at least 60%, at least 75% or even higher. For example, high quality polarizing eyeglasses may attain 99% polarization efficiency or more. Generally, the color effect provided by the present disclosure is more pronounced for higher polarization efficiencies, but on the other hand polarizing layers with higher polarization efficiencies are more costly to manufacture.

Such polarizing layers are per se well known in the art. Examples and further information on polarizers and polarizing layers may for example be found in the Wikipedia article on polarizers en.wikipedia.org/wiki/polarizer as of Jul. 11, 2016. For eyeglasses, for example microscopic grating structures may be used for achieving a polarizing effect. Such eyeglasses are commercially available, for example as mentioned on www.zeiss.de/vision-care/de_de/products-services/veredelungen-und-toenungen/sonnenschutz-und-filterglaeser/polarisierende-brillenglaeser.html as of Aug. 19, 2016.

A birefringent layer is a layer comprising a birefringent material. Birefringence is the optical property of a material having a refractive index that depends on the polarization and propagation direction of the light. Crystals with non-cubic crystal structures are often birefringent, as are plastic materials under stress, e.g., mechanical stress.

The simplest and most common type of birefringence appears in uniaxial materials. In uniaxial materials, there is a single direction referred to as the optical axis, and the optical properties are rotationally symmetric with respect to the optical axis, hence the term uniaxial. Light whose polarization is perpendicular to this optical axis experiences a refractive index $n_o$ (referred to as ordinary index), whereas light having a polarization in the direction of the optical axis experiences a different refractive index $n_e$ (referred to as extraordinary index). A light ray having a polarization direction perpendicular to the optical axis is referred to as an ordinary ray. A light ray having a polarization component in the direction of the optical axis is referred to as an extraordinary ray. This optical axis preferably lies in the plane in which the birefringent layer extends.

Birefringence is for example described in Zinth/Körner, Physik III., first edition 1994, R. Oldenburg Verlag GmbH, pages 164-178.

The birefringent layer may be made of a transparent plastic material like polycarbonate or polystyrene under mechanical stress like tensile stress (also referred to as tension). Mechanical stress in such materials causes birefringence by breaking a symmetry of the crystal structure of such materials. Such materials are comparatively inexpensive and suitable for mass production. Stress-induced birefringence in such materials is a well-known property and for example described in E. Milby, "Investigating Stress Birefringence Using Photoelasticity", fp.optics.arizona.edu/optomech/archive/Spr10/523L/Individual%20Project/

Ezra_final%20Lab% 20Writeup.pdf, or in R. Wimberger-Friedl, Journal of Polymer Science Part B: Polymer Physics Vol. 32, Issue 4, 1994.

Stress like tension may be introduced mechanically, for example by stretching a film of the transparent plastic material, or by thermal treatment, as described for example in the above-cited article by R. Wimberger-Friedl. Stress may also be induced chemically, as chemical inhomogeneities can lead to local variations of the thermal expansion coefficient and therefore to permanent mechanical stress. Therefore, the introduction of birefringence by stress per se is well understood and may be easily used for manufacturing eyewear according to an aspect of the present disclosure.

The birefringent layer introduces an optical path difference between the ordinary ray and the extraordinary ray depending on the geometric distance (thickness of the birefringent layer in the viewing direction) and the difference between the refractive indices $n_o$ and $n_e$. This optical path difference causes a color effect for polarized light falling onto the transparent component on the side of the birefringent layer which is seen when viewed from the side of the polarizing layer based on interference. For this effect, the polarized light needs to have a polarization direction neither parallel nor perpendicular to the optical axis, but in between, such that the light has an extraordinary ray component and an ordinary ray component, preferably of approximately the same intensity.

Polarized light is for example generated when sunlight is reflected from nonmetallic surfaces or also glass surfaces like windshields of cars, or liquids like water puddles on a street. The polarization efficiency of such a reflection depends on the angle of incidence. Light reflected from other kinds of material like stone is not polarized. Details are described, e.g., in "Polarisiertes Licht (Polarized Light)," www.physik.uni-erlangen.de/lehre/daten/Nebenfachpraktikum/Polarisiertes Licht.pdf as of Sep. 14, 2016. Therefore, when viewed through the transparent component described above, surfaces of materials causing a polarization of light are seen with a color effect, while other surfaces may be seen normally.

In a preferred embodiment, an angle between a polarization direction of the linearly polarizing layer and the transmitting polarizations planes (ordinary and extraordinary) of the birefringent layer is about 45°, for example between 40 and 50°. Such an angle leads to a pronounced color effect.

The thickness of the birefringent layer in the viewing direction may be selected such that the above-mentioned optical path difference between ordinary and extraordinary ray leads to interference effects around the $2^{nd}$ and $3^{rd}$ order. This leads to a brighter and more colorful effect compared to other orders. This means that the optical path difference is typically between 400 nm and 1700 nm, and more typically between 550 nm and 1650 nm.

The polarizing layer and the birefringent layer may, but need not necessarily be fixedly coupled with each other to provide the transparent component as a single unit (in contrast to physically separate components), for example to provide eyeglass lenses which may be shipped and incorporated into eyeglass frames elsewhere.

In some embodiments, the birefringent layer may have constant properties over the plane, which leads to a same color effect over the complete transparent component. In other embodiments, the properties may be varying. For example, the layer thickness of the birefringent layer may vary, and/or the birefringent properties (difference between $n_o$ and $n_e$) may change for example due to a different stress of a plastic material over the area of the polarizing layer. In such a case, a varying color effect over the transparent component is achieved.

In a further preferred embodiment, the transparent component comprises a further polarizing layer arranged such that the birefringent layer is sandwiched between the polarizing layer and the further polarizing layer. A polarization direction of the further polarizing layer is preferably different from a polarization direction of the polarizing layer, for example approximately perpendicular thereto (for example within an angular range of 80° to 100° or 85° to 95°.

In such embodiments, by the further polarizing layer all light falling on the transparent component is polarized. Therefore, all light is subjected to the color effect. In other words, a complete scene viewed through the transparent component appears colored by the color effect.

In a further aspect, a method for manufacturing eyewear may be provided, which includes providing a linearly polarizing layer and providing a birefringent layer such that a viewing direction of the eyewear runs through the linearly polarizing layer and the birefringent layer.

Details of these layers described above also apply to the method. For example, the birefringent layer may be manufactured by providing a stressed plastic layer, wherein the stress may be induced mechanically, thermally and/or chemically, as described above. Also, the method may comprise providing a further linearly polarizing layer, as also discussed above. The method may be used to manufacture the eyewear as described above.

BRIEF DESCRIPTION OF THE DRAWINGS

The disclosure will now be described with reference to the drawings wherein.

DESCRIPTION OF EXEMPLARY EMBODIMENTS

Figure 1:
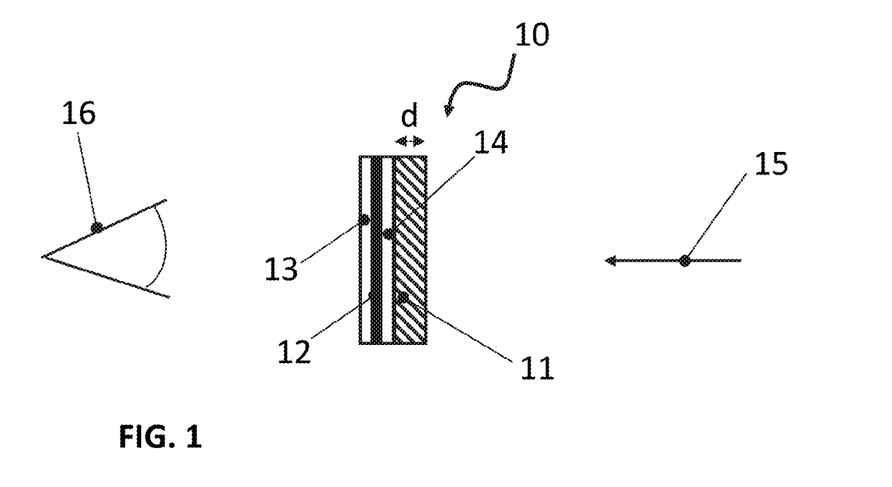
FIG. 1 is a cross-sectional view of a transparent component according to an exemplary embodiment.

FIG. 1 is a cross-sectional view of a transparent component 10 according to a typical embodiment. The transparent component 10 has a layer structure comprising a birefringent layer 11 and a linearly polarizing layer 12. The birefringent layer 11 in the exemplary embodiment shown is a stressed plastic layer, in particular a polycarbonate layer. Furthermore, transparent component 10 of FIG. 1 includes transparent spacer layers 13, 14, which may be made of any suitable transparent material and essentially do not contribute to the optical function of the transparent component, linearly polarizing layer 12 is closer to eye 16 than birefringent layer 11. Layers 11 to 14 extend in parallel planes.

Figure 2:
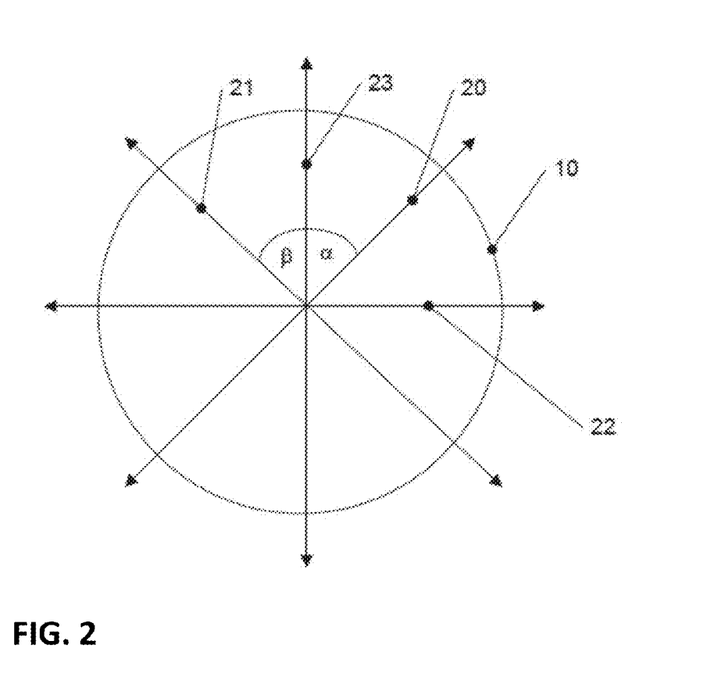
FIG. 2 is a plan view of the component of FIG. 1.

FIG. 2 shows a plan view of transparent component 10 to illustrate various axes and directions. Transparent component 10 in FIG. 2 is shown as having a circular shape. However, transparent component 10 may also be provided in other shapes like a rectangular shape, an ellipsoidal shape or others.

Numeral 20 in FIG. 2 designates an axis (i.e., ordinary axis) of birefringent layer 11. Numeral 21 designates a direction perpendicular thereto and therefore illustrates the extraordinary axis. Numeral 23 illustrates a polarizing direction of linearly polarizing layer 12. In the exemplary embodiment of FIGS. 1 and 2, angle α between the axis 20 and the polarizing direction 23 and angle β between the ordinary axis 21 and polarizing direction 23 are both approximately 45°.

Arrow 22 illustrates an example polarizing direction of incoming light 15 shown in FIG. 1. Polarizing direction 22 of incoming light 15 is perpendicular to polarizing direction 23 of linearly polarizing layer 12. Transparent component 10 may be oriented in use such that polarizing direction 23 is vertical (perpendicular to the ground). In this case, polarizing direction 22 corresponds to the horizontal direction. Such horizontally polarized light is for example generated when sunlight is reflected from certain surfaces like glass surfaces, certain nonmetallic surfaces, or water surfaces. Without the birefringent layer 11, light polarized in polarizing direction 22 would not be transmitted through transparent component 10 due to the presence of polarizing layer 12 because polarizing direction 22 is perpendicular to polarizing direction 23.

However, due to the presence of birefringent layer 11, the light from the ordinary and extraordinary ray can interfere, which leads to a color effect that is visible to eye 16. In particular, with a polarization direction 22 as shown, the light may be decomposed in a component parallel to ordinary axis 20 and a component parallel to extraordinary axis 21, which experience different refractive indices and therefore different optical path lengths through birefringent layer 11. This effectively leads to a change of polarization and to interference effects causing a color effect experienced by a user. In particular, depending on a path length difference between the optical path lengths, the ordinary and extraordinary rays of a particular color may interfere constructively or destructively at the polarizing layer, resulting in the discussed color effect.

In particular, the optical path difference Δ for an ordinary ray component (polarization parallel to axis 20) and an extraordinary ray component (polarization perpendicular to axis 20) may be written as $$\Delta = n_o \cdot d - n_e \cdot d.$$

$n_o$ is the ordinary refractive index, $n_e$ is the extraordinary refractive index, and d is the thickness of birefringent layer 11, as illustrated in FIG. 1.

Figure 3:
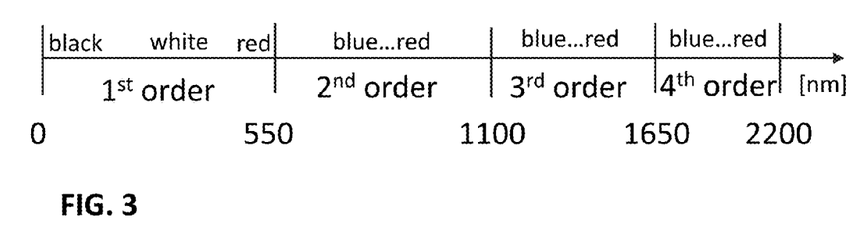
FIG. 3 is a diagram illustrating different orders of a color effect.

Depending on the optical path difference Δ, white light having a polarization corresponding to polarization direction 22 appears in different colors, as illustrated in FIG. 3. Specifically, FIG. 3 illustrates colors as they are appearing depending on the optical path length difference Δ in nm. For a path length difference of zero, essentially no light is transmitted as explained above, corresponding to black. With increasing path length difference, a high transmission (marked as white in FIG. 3) occurs, then turning to red up to a path length difference of 550 nm. This corresponds to the first order of transmission. For higher path length differences, then second order, third order, and fourth order etc. follow, as illustrated. Within each order, the scene color changes from blue to red. For higher orders, a light intensity or color saturation decreases. Therefore, preferably second and third order are used to provide the color effect of the present disclosure, corresponding to path length differences between about 550 nm and 1650 nm.

It should be noted that this effect only occurs for polarized light. Unpolarized light does not exhibit such a color effect when using the transparent component 10 of FIG. 1. Therefore, only objects emitting polarized light appear colored when viewed through transparent component 10.

Figure 4:
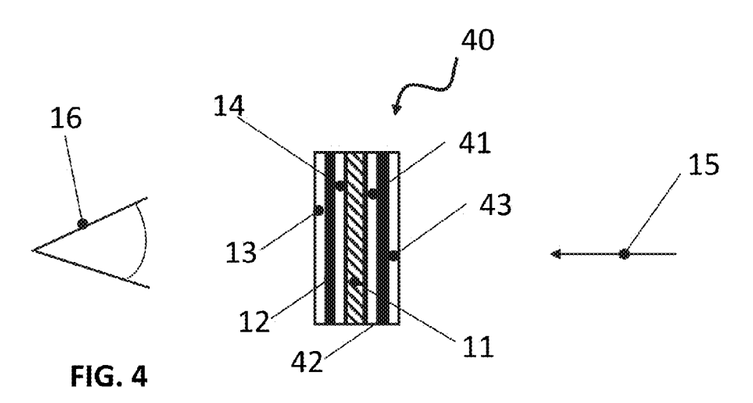
FIG. 4 is a cross-sectional view of a transparent component according to another exemplary embodiment.

FIG. 4 illustrates an exemplary embodiment of an optical component 40 which provides a coloring effect not restricted to polarized light falling on transparent component 40. Transparent component 40 comprises the layers already discussed with reference to FIG. 1, and these bear the same reference numerals and will not be described again in detail. In addition to the layers described with respect to FIG. 1, transparent component 40 comprises a further linearly polarizing layer 42 sandwiched between two further spacer layers 41, 43. Compared to polarizing layer 12, further polarizing layer 42 is arranged on the other side of birefringent layer 11, such that birefringent layer 11 is sandwiched between polarizing layer 12 and further polarizing layer 42.

A polarization direction of further polarizing layer 42 is chosen to be essentially perpendicular to a polarization direction of polarizing layer 12. Referring back to FIG. 2, a polarization direction of further polarizing layer 42 then corresponds to the direction indicated by numeral 22.

In this way, components of incoming light as indicated by arrow 15 which are not polarized in the polarizing direction of further polarizer 42 are removed, such that all light reaching birefringent layer 11 is polarized. This leads to the color effect being present even if unpolarized light falls on transparent component 40.

Birefringent layer 11 may be homogeneous, i.e., have the same birefringent properties over a complete area thereof. This leads to a uniform color effect. In other embodiments, the birefringent properties may be inhomogeneous, which leads to a varying color effect as shown in FIG. 5.

Figure 5:
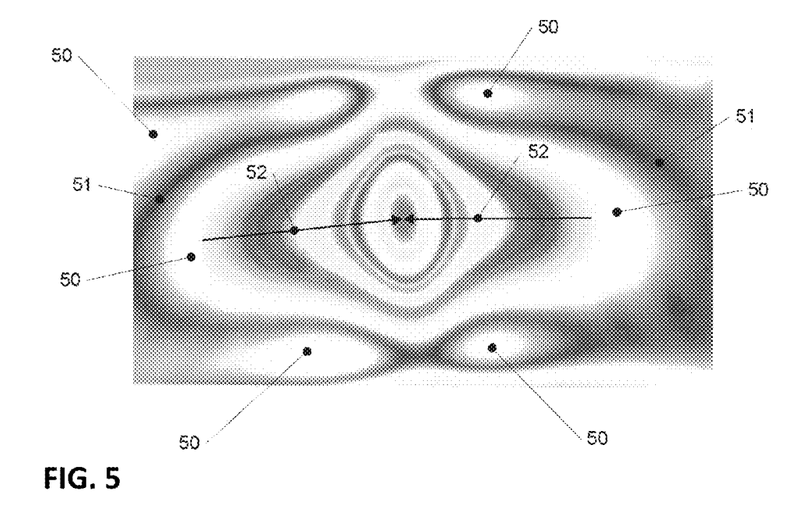
FIG. 5 is a diagram for illustrating a color effect.

FIG. 5 illustrates an effect achieved by a mechanically stressed polycarbonate substrate, where the stress is non-uniform, leading to non-uniform birefringent behavior over the area of the substrate. The substrate is illuminated with polarized light and viewed through a polarization filter corresponding to polarizing layer 12. In the example shown, areas 50 appear essentially white, and areas 51 appear essentially black, corresponding to the first order (see FIG. 3). Along arrows 52, second order up to fifth order are traversed with colors repeatedly going from blue towards red. Therefore, when using a birefringent layer with varying birefringent properties, a varying color effect may be achieved.

Figure 6:
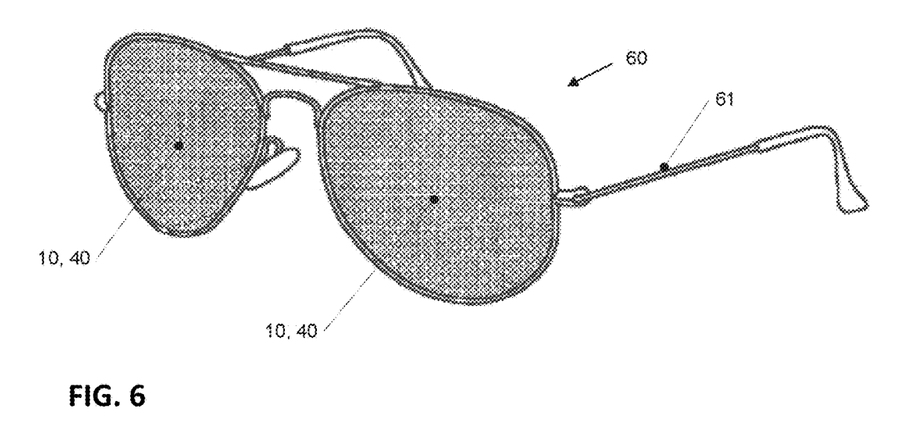
FIG. 6 is a perspective view of eyeglasses using transparent components according to an exemplary embodiment.

FIG. 6 illustrates an application example of an eyewear with transparent components as discussed above in form of eyeglasses 60. Specifically, eyeglasses 60 comprise a frame 61 with two transparent components 10 of FIG. 1 or two transparent components 40 of FIG. 4 inserted as eyeglass lenses. When a user wears such eyeglasses 60, he/she experiences the color effect when viewing his/her surroundings. Transparent components 10, 40 are provided such that, when eyeglasses 60 are worn in the conventional way, polarizing layer 12 faces toward the eyes of the person wearing eyeglasses 60, whereas birefringent layer 11 is further away from the eyes than polarizing layer 12.

Figure 7:
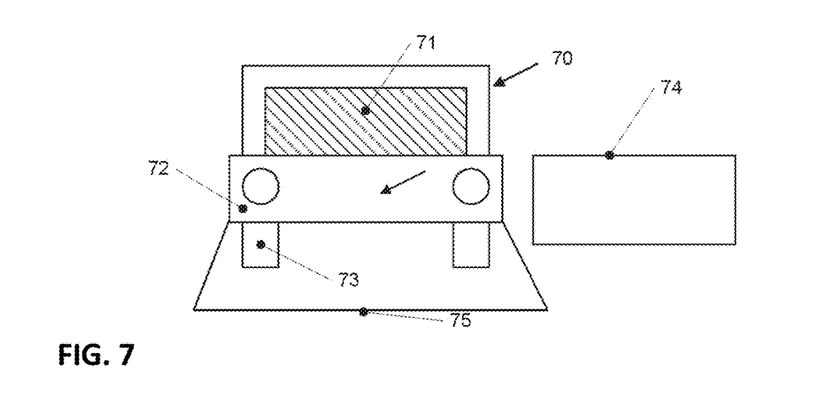
FIG. 7 illustrates a scene viewable through transparent components of an exemplary embodiment.

FIG. 7 illustrates an example scene which may be viewed through eyeglasses 60 shown in FIG. 6. The example scene of FIG. 7 includes are car 70 having a windshield 71, a car body 72 and tires 73. Moreover, the scene comprises a street 75 on which car 70 drives as well as a stone wall 74.

Windshield 71 as well as car body 72, when reflecting sunlight, horizontally polarize the light. On the other hand, stonewall 74 and street 75 as well as tires 73 reflect the light unpolarized. Therefore, when viewed through glasses 60 having transparent component 10 as eyeglass lenses, windshield 71 as well as car body 72 appear colored by the described color effect. With constant birefringent properties of the birefringent layer, windshield 71 and car body 72 appear colored by a single color. With varying birefringent properties, the color varies. On the other hand, tires 73, wall 74, and street 75 do not appear colored. Such eyeglasses may be suitable for driving, as other vehicles appear highlighted through the color effect. On the other hand, if transparent components 40 of FIG. 4 are used as eyeglass lenses, all elements of the scene appear colored by the color effect. This may be distracting and is therefore not suitable for a driver, but may be used for amusement.

Figure 8:
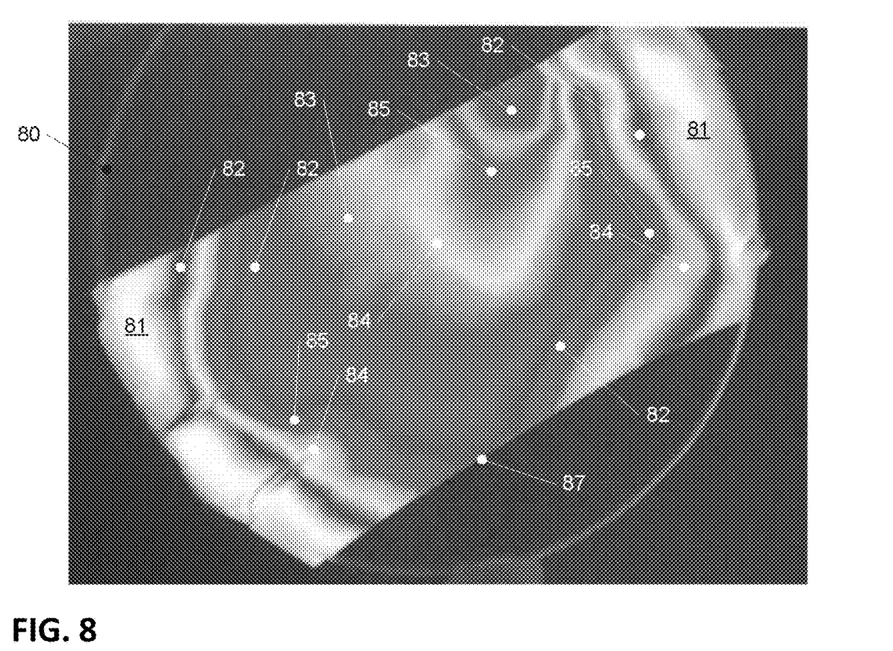
FIG. 8 illustrates color effects provided by birefringent layers of an exemplary embodiment.
Figure 9:
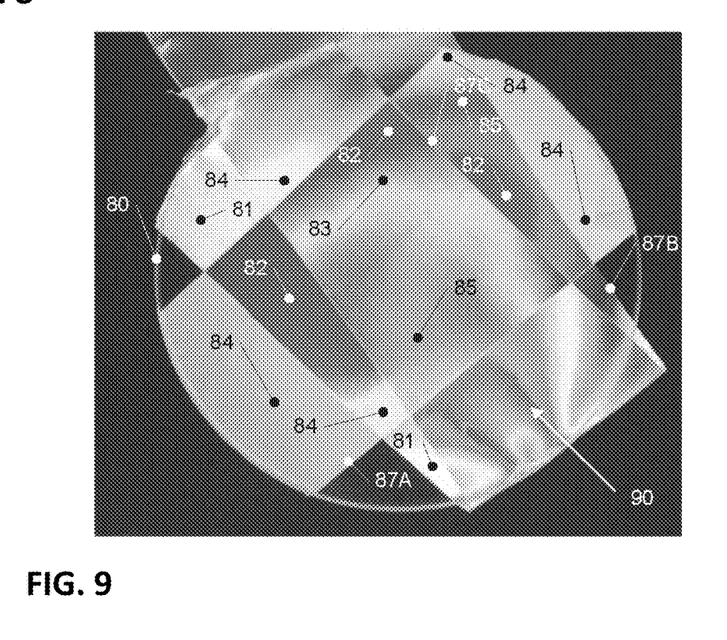
FIG. 9 illustrates color effects provided by birefringent layers of another exemplary embodiment.
Figure 10:
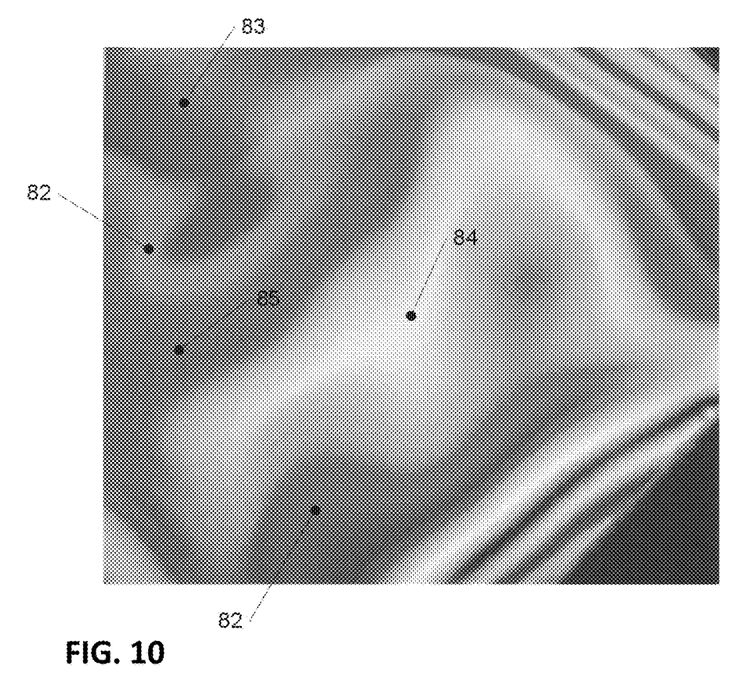
FIG. 10 illustrates color effects provided by birefringent layers of yet another exemplary embodiment.

FIGS. 8 to 10 further illustrate the color effect obtainable by the present disclosure. In FIGS. 8 to 10, colors are indicated by reference numerals. As the color effect in these examples provides color gradients, this is merely a rough indication of the respective colors. In FIGS. 8 to 10, numeral 81 represents white, numeral 82 represents blue, numeral 83 represents green, numeral 84 represents yellow, and numeral 85 represents red.

In FIG. 8, a polyethylene tape 87 is stretched over a non-birefringent quartz plate 80, illuminated with polarized light from a computer monitor and viewed through a polarizer (in this context also referred to as analyzer). The achieved path length difference was up to 1400 nm corresponding to $3^{rd}$ order interference effects.

In FIG. 9, three layers 87A, 87B, and 87C of polyethylene tape were stretched over non-birefringent quartz plate 80, illuminated with polarized light from a computer monitor and viewed through a polarizer. In an area 90, due to folding of the tape larger stress variation occurred over smaller distances, leading to stronger color variations over distance. Depending on the overlap between the layers 87A, 87B, and 87C, different path differences and hence different colors are provided.

In FIG. 10, a thermally treated polycarbonate substrate is illuminated with polarized light from a computer monitor and viewed through a polarizer, showing color effects based on interference of $2^{nd}$ order.

Figure 11:
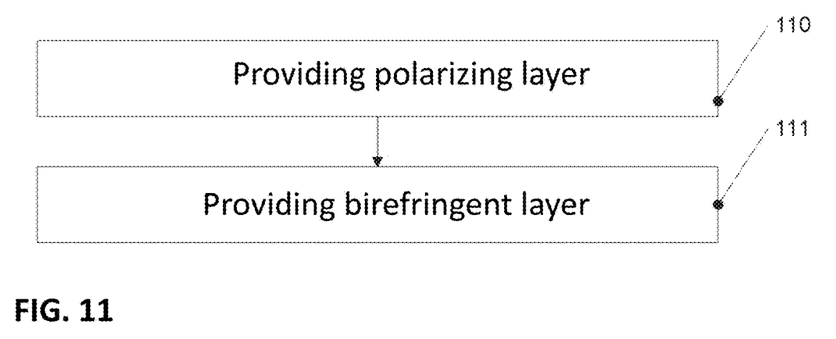
FIG. 11 is a flowchart illustrating a method according to an exemplary embodiment.

FIG. 11 is a flowchart illustrating a method according to an exemplary embodiment for manufacturing a transparent component as discussed above. All explanations regarding materials, effects, arrangements of layers etc. made above for the transparent component are also applicable to the method of FIG. 11 and will therefore not be repeated again.

In step 110, the method comprises providing a linearly polarizing layer (layer 12). In step 111, the method comprises providing a birefringent layer (layer 11). This may include providing a stressed plastic layer, wherein the stress may be induced mechanically, thermally and/or chemically as discussed above.

It should be noted that the order in which the steps are depicted in FIG. 11 is not limiting and may also be reversed.

The term "comprising" (and its grammatical variations) as used herein, is used in the inclusive sense of "having" or "including" and not in the exclusive sense of "consisting only of" The terms "a" and "the" as used herein are understood to encompass the plural as well as the singular.

All publications, patents, and patent applications cited in this specification are herein incorporated by reference, and for any and all purposes, as if each individual publication, patent, or patent application were specifically and individually indicated to be incorporated by reference. In the case of inconsistencies, the present disclosure will prevail.

It is understood that the foregoing description is that of the preferred embodiments of the disclosure and that various changes and modifications may be made thereto without departing from the spirit and scope of the disclosure as defined in the appended claims.

The invention claimed is:

1. An eyewear having a transparent component, the transparent component comprising:
   a linearly polarizing layer, and
   a birefringent layer,
   wherein a viewing direction of the eyewear extends perpendicularly through the linearly polarizing layer and the birefringent layer, and
   wherein a thickness of the birefringent layer in the viewing direction is selected to provide an optical path difference between an ordinary ray and an extraordinary ray in a range of from 400 nm to 1700 nm.

2. The eyewear of claim 1, wherein a polarizing direction of the linearly polarizing layer forms an angle ($\alpha$) between 40° and 50° with the axis of the ordinary ray or extraordinary ray of the birefringent layer.

3. The eyewear of claim 1, wherein the birefringent layer has constant birefringent properties across a plane including the birefringent layer.

4. The eyewear of claim 1, wherein the birefringent layer has varying birefringent properties across a plane including the birefringent layer.

5. The eyewear of claim 1, wherein the transparent component further comprises an additional polarizing layer arranged such that the birefringent layer is located between the polarizing layer and the further polarizing layer.

6. The eyewear of claim 5, wherein a polarization direction of the further polarizing layer forms an angle between 80° and 100° with the polarization direction of the polarizing layer.

7. The eyewear of claim 1, wherein the polarizing layer and the birefringent layer are fixedly coupled with each other.

8. The eyewear of claim 5, wherein the further polarizing layer and the birefringent layer are fixedly coupled with each other.

9. The eyewear of claim 5, wherein the polarizing layer, the birefringent layer, and the further polarizing layer are fixedly coupled with each other.

10. The eyewear of claim 1, wherein the transparent component is configured to provide a color effect by interference of a $2^{nd}$ and/or a $3^{rd}$ order.

11. A method for manufacturing eyewear, comprising:
    providing a linearly polarizing layer, and
    providing a birefringent layer such that a viewing direction of the eyewear extends perpendicularly through the linearly polarizing layer and the birefringent layer,
    wherein the birefringent layer is provided with an optical path difference between ordinary and extraordinary ray between 400 nm and 1700 nm.

12. The method of claim 11, wherein providing the birefringent layer comprises providing a stressed plastic material by inducing stress mechanically, thermally and/or chemically.

13. The method of claim 11, further comprising:
provi­ding an additional linearly polarizing layer such that the birefringent layer is arranged between the linearly polarizing layer and the further linearly polarizing layer.

* * * * *